3,347,622
METHOD FOR PREPARING $(NH_4)_2Pt(SCN)_6$

Eugene A. Hausman, Cranford, and George R. Pond, Newark, N.J., assignors to Engelhard Industries, Inc., Newark, N.J., a corporation of Delaware
No Drawing. Filed Apr. 17, 1963, Ser. No. 273,582
3 Claims. (Cl. 23—50)

Our invention relates to an improved method for the preparation of the ammonium salt of hexathiocyanato-platinic acid, the salt having the formula $(NH_4)_2[Pt(SCN)_6]$. The salt prepared by practicing the method of our invention is useful in the preparation of hexathiocyanato-platinic acid, $H_2[Pt(SCN)_6]$, which in turn is useful in the preparation of platinum-alumina catalysts useful in the reforming of straight run naphtha to improve its octane number, as is more fully described in our copending application, Ser. No. 273,559, filed of even date herewith, entitled "Process and Product."

The ammonium salt of hexathiocyanato-platinic acid is known. Thus, it is mentioned on page 1616 of vol. II of Sidgwick, "Chemical Elements and Their Compounds," and in the references cited therein. Also, page 224 of Gmelin, "Handbook of Inorganic Chemistry," vol. 68C (1939) and the references cited therein decribe various methods for the preparation of the ammonium salt of hexathiocyanato-platinic acid. For example, the compound is formed when $NH_4CNS$ reacts with an aqueous solution of $$[Pt(C_3H_5(NH_2)_2NH_3Cl)Cl_4] \cdot H_2O$$

The ammonium salt is also made by dissolving $$K_2[Pt(CNS)_6]$$

in a large excess of $NH_4CNS$. The desired compound in water-free form is obtained by repeated crystallization from 95 percent alcohol. In addition, the ammonium salt can be prepared by boiling 3.5 parts by weight of $$K_2[Pt(CNS)_6]$$

with one part by weight of $(NH_4)_2SO_4$ in a moderately concentrated solution for a few minutes. After cooling, the ammonium salt is extracted in order to separate the potassium sulfate and ammonium sulfate, and the ammonium salt is then purified by crystallization from water. Still another method for the preparation of the ammonium salt of hexathiocyanato-platinic acid involves digesting an alkali metal thiocyanate with $(NH_4)_2PtCl_4$.

In accordance with the method of our invention, we prepare the ammonium salt of hexathiocyanato-platinic acid by reacting chloroplatinic acid ($H_2PtCl_6$) and ammonium thiocyanate in aqueous solution. The reaction can be exemplified by the equation:

$$6NH_4SCN + H_2PtCl_6 \rightarrow (NH_4)_2Pt(SCN)_6 + 4NH_4Cl + 2HCl$$

When the chloroplatinic acid and the ammonium thiocyanate are reacted in aqueous solution in accordance with the method of our invention, the reaction should be carried out in a particular manner. Thus, the reaction should be effected at a temperature not exceeding about 75° C. The reason for this is that the ammonium salt of hexathiocyanato-platinic acid decomposes at temperatures not substantially exceeding 75° C. In carrying out the process of our invention, it is preferred that a temperature within the range from 50° C. to 75° C. be used, since at temperatures within that range the reaction proceeds rapidly without decomposition of the desired salt.

Moreover, in carrying out the process of our invention, the reactants should be admixed in such manner that undue precipitation of the ammonium salt of chloroplatinic acid does not take place, inasmuch as this salt is an undesirable by-product which is so insoluble that it is difficult to redissolve it in the reaction mixture in order to convert it into the desired product. The ammonium salt of chloroplatinic acid dissolves to the extent of about 0.7 gram in 100 ml. of water at 15° C. Hence, in carrying out our process, the concentration of the reactants should be sufficiently dilute that undue precipitation of the ammonium salt of chloroplatinic acid does not take place. On the other hand, for optimum results the concentration of the reactants should not be too dilute, or otherwise the problem of recovering the desired salt from the reaction mixture is more difficult than it need be. Slow admixing of the reactants assists in preventing the precipitation of the ammonium salt of chloroplatinic acid, as does slowly adding a solution of chloroplatinic acid to a relatively large, stirred mass of a solution of the ammonium thiocyanate.

The following example illustrates an embodiment falling within the scope of our invention:

Example 1

79 grams of $NH_4SCN$ is dissolved in one liter of water and the solution is filtered. This solution is heated to 75° C., stirred, and a solution of 60 grams of $H_2PtCl_6$ in 400 cc. of water at 75° C. is added drop-wise over a period of two and one-half hours with stirring being continued. The rate of addition is slow at first, until a deep red solution results, and then the rate of addition is increased. However, the rate of addition does not exceed the point where a large excess of precipitate appears. Air is blown across the reaction mixture in order to maintain the total volume of the reaction mixture at about one liter.

After the addition is complete, the solution is heated for forty-five minutes at 75° C. The solution is then filtered hot through a fluted filter in a steam cone, and then chilled in ice water for one hour. The orange-red crystals of $(NH_4)_2Pt(SCN)_6$ are separated by filtration, washed with acetic acid and dried overnight in a vacuum desiccator. The yield of $(NH_4)_2Pt(SCN)_6$ is 55 grams, and the platinum is 33.4 percent by weight. The theoretical platinum in $(NH_4)_2Pt(SCN)_6$ is 33.7 percent by weight.

We claim:
1. A method for the preparation of $(NH_4)_2Pt(SCN)_6$ which comprises mixing an aqueous solution of chloroplatinic acid and an aqueous solution of ammonium thiocyanate heating the solution and maintaining it at a temperature not exceeding about 75° C., the concentration of the reactants and the rate of mixing being such that undue precipitation of the ammonium salt of chloroplatinic acid does not take place filtering the solution and cooling whereby crystals of $(NH_4)_2Pt(SCN)_6$ are formed and thereafter separating said crystals.
2. The method of claim 1 wherein the aqueous solution of chloroplatinic acid is added slowly to the aqueous solution of ammonium thiocyanate.
3. The method of claim 1 wherein the mixing is carried out at a temperature within the range from 50° C. to 75° C.

References Cited

Buckton: The Quarterly Journal of the Chemical Society of London, vol. 7, 1855, pp. 22 to 43. pp. 26–40 relied on.

Gmelin: "Handbuch der Anorganischen Chemie," Aufl. 8, system No. 68 C., 1939, pp. 210, 211, 212 and 224.

OSCAR R. VERTIZ, Primary Examiner.

H. T. CARTER, Assistant Examiner.